Sept. 10, 1957 — H. WIDMER — 2,805,591
TOOL FOR MAKING A PIPE COUPLING
Filed Dec. 16, 1955
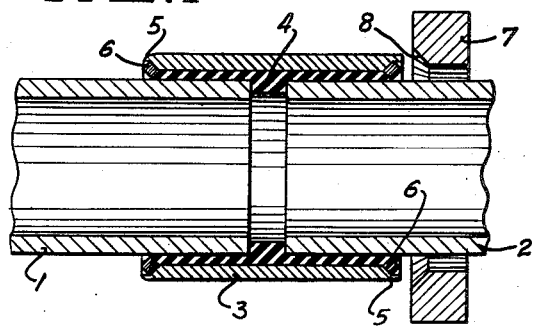
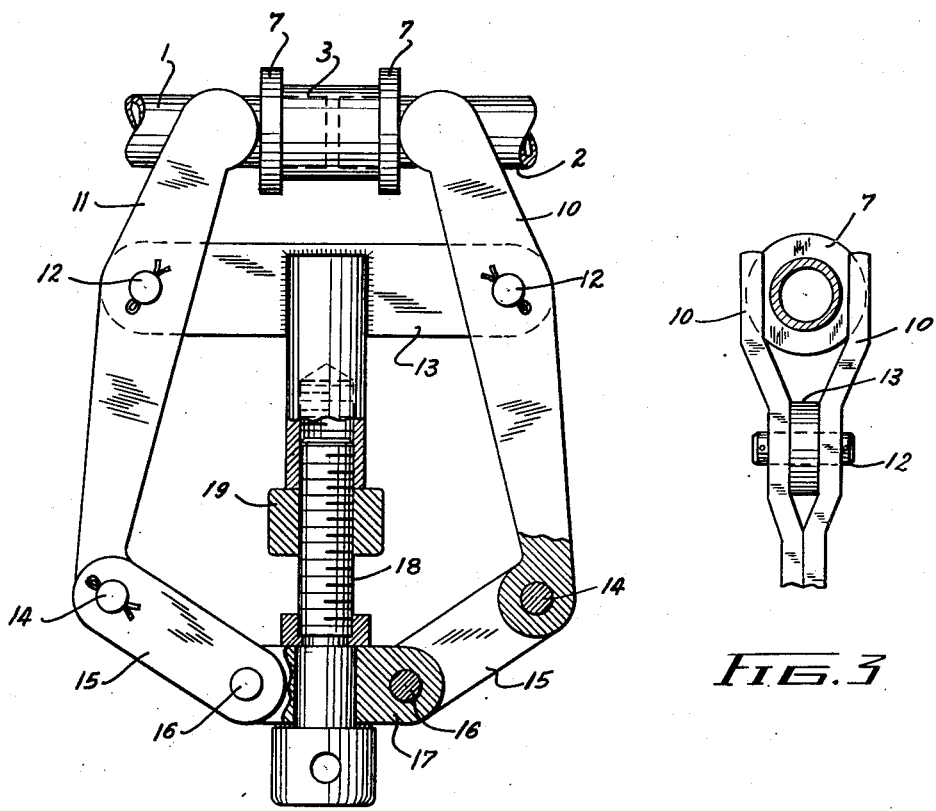
INVENTOR.
HANS WIDMER
BY
ATTORNEY

United States Patent Office 2,805,591
Patented Sept. 10, 1957

2,805,591

TOOL FOR MAKING A PIPE COUPLING

Hans Widmer, Zollikon, Switzerland

Application December 16, 1955, Serial No. 553,526

2 Claims. (Cl. 81—15)

This invention relates to pipe couplings and more particularly to an apparatus for the execution of the coupling to place it in a position for joining two ends of pipe in a permanent connection.

An object of this invention is to provide a pipe coupling of a cylindrical component which overlaps the contiguous pipe butt-ends, using a sealer between the coupling and the pipe ends.

In the invention sealing rings are provided at the coupling terminals. These rings set into recesses in the coupling body against the pipes. The edges of the coupling body are thereby partially bent down by said rings against the surface of the pipe.

The invention also contemplates the process for the manufacture of the pipe coupling in which the sealing rings are placed on the pipe ends, the coupling body and the sealing means are brought together over the contiguous butt-ends of the pipe, and the sealing rings are pressed partially over the ends of the coupling.

To execute this process a suitable tool is provided including two pressure levers swingably mounted in opposite directions by means of a lead screw and nut which levers have forked terminals. This terminal arrangement serves to overlap the pipe ends to press the sealing rings against the sealing means and the coupling body and finally to press the edges of the rings over the coupling means.

In the attached drawing, in the body of the coupling an arrangement for the execution of the process has been schematically represented.

Fig. 1 shows a longitudinal section of the coupling.

Fig. 2 is an elevation of the means for effecting the coupling.

Fig. 3 is a partial elevation taken at right angles to Fig. 2.

In the drawings Figs. 1 and 2 designate the ends of the pipe contiguously placed. The coupling body 3 overlaps the butt-ends with clearance and in the interspace between the pipe on the one hand and the coupling body 3 on the other hand a sealer 4 has been applied, for instance, rubber, plastics, etc. On the terminal of the coupling body 3 recesses for sealing rings 6 have been provided. The rings 6 generally enter into said recesses. Said sealing rings are positioned at the ends of the coupling body. The edges of the coupling body 3 are partially bent over the sealing rings when the pipe coupling is completed, in order to secure said rings in their sealing position. Said edges may be bent over the rings 6 along their entire circumference or only at individual points on said circumference.

The described pipe coupling is manufactured in such manner, that the sealer material and coupling body are slid over the pipe ends, and the sealing rings 6 are placed in position. Thereafter, pressure discs 7 are mounted on tube ends 1, 2 which discs may be pressed against the ends of the coupling body by means of a tool still to be described. These pressure discs 7, of which one is shown in Fig. 1, are provided with beveled surface 8, which, when pressed against the coupling body, bend the edges of the same against the sealing rings. As per this process, therefore, and by moving the two pressure discs 7 toward each other, the sealer material is compressed while the end edges of the coupling body are concurrently bent down over rings 6, along their entire circumference.

To execute the above described process, the tool shown in Figs. 2 and 3 is used. This tool comprises two pressing levers, swingably mounted to move in opposite directions, which pressing levers are designated by the numbers 10, 11. The forked extremities of said levers overlap pipe ends 1, 2, pressing via discs 7, sealing rings 6 toward each other and thereby bending the end edges of the coupling body down over said rings. Both levers 10, 11 pivot around pins 12 and are swingably mounted on frame 13. The remote ends of double-armed links 10, 11 are bolted to levers 15 by pins 14, which links 15, by means of pins 16, are connected to hub 17. Said hub 17 and frame member 13 support lead screw 18 which engages nut 19, rigidly attached to frame 13. By turning lead screw 18 clockwise or counterclockwise, the outer ends of the double-armed pressing levers may be moved toward or away from each other.

Experience has shown that tight pipe couplings and connections may be rapidly and perfectly produced in the manner described and utilizing the tool discussed above.

I claim:

1. A device for joining pipe sections comprising a pair of levers pivotally mounted on opposite ends of a cross-arm joining said levers so as to swing in opposite directions, a nut rigidly supported by said arm, a lead screw engaging said nut and a linkage supporting the outer end of said lead screw and the outer ends of said levers, said levers having forked ends which exert pressure on securing means connecting said pipe sections when the lead screw is turned to advance the forked ends toward each other.

2. A device as set forth in claim 1 wherein the joining utilizes a pair of sealing rings which are pressed over a sealing mass, characterized in that the forked ends of said levers engage said sealing rings and force said rings over the sealing mass when the lead screw is turned to advance the forked ends toward each other.

References Cited in the file of this patent

UNITED STATES PATENTS

| | | |
|---|---|---|
| 493,118 | Robinson | Mar. 7, 1893 |
| 848,036 | Kruger | Mar. 26, 1907 |
| 865,498 | Kenyon | Sept. 10, 1907 |
| 887,103 | Lane | May 12, 1908 |
| 1,461,130 | Loughead | July 10, 1923 |
| 2,117,046 | Welker | May 10, 1938 |
| 2,325,465 | Bannister | July 27, 1943 |
| 2,444,380 | Shimek | June 29, 1948 |
| 2,484,192 | Squiller | Oct. 11, 1949 |